United States Patent Office 2,729,626
Patented Jan. 3, 1956

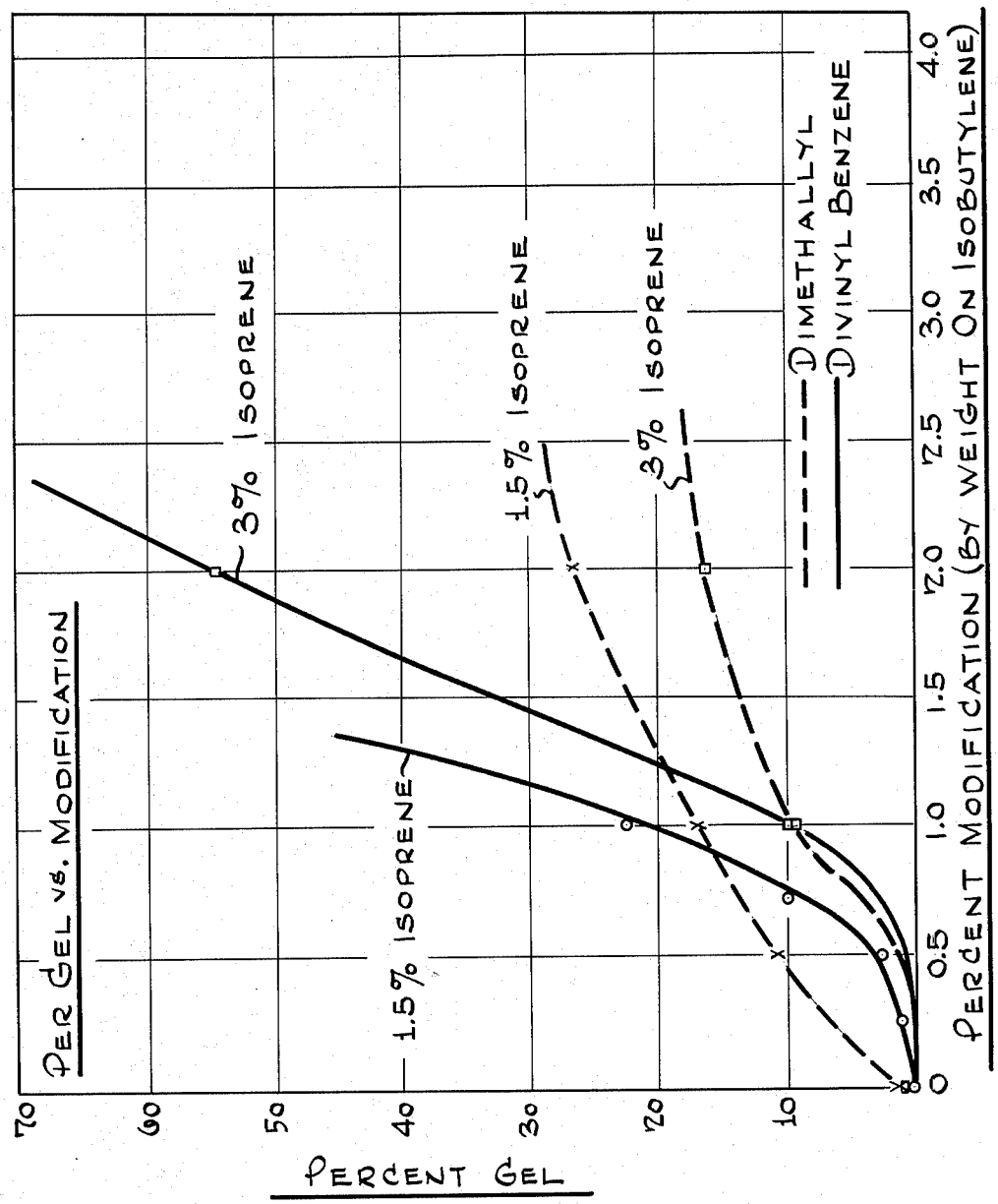

2,729,626
ISOOLEFIN-MULTIOLEFIN COPOLYMERS

Lester M. Welch, Madison, Howard L. Wilson, Raritan Township, Middlesex County, and Luther B. Turner, Cranford, N. J., assignors to Esso Research and Engineering Company, a corporation of Delaware Application May 1, 1952, Serial No. 285,392
13 Claims. (Cl. 260—80.7)

This invention relates to improved rubbery polymeric materials and relates particularly to interpolymeric materials and means for improving their toughness and physical properties after vulcanization, especially for the insoluble copolymers having relatively high gel content. The invention relates particularly to vulcanizable isoolefin-diolefin interpolymeric materials of low unsaturation containing relatively minor amounts of a divinyl aromatic compound for modifying the properties of the raw polymer.

It has hitherto been known to prepare valuable rubbery copolymers by polymerizing mixtures of a major proportion of an isoolefin such as, specifically, isobutylene, with a minor proportion of conjugated diolefins, for example, butadiene, isoprene, piperylene, dimethyl butadiene and the methyl pentadienes. The presence of a diolefin permits the preparation of a copolymer in which the chemical unsaturation is sufficiently high to permit vulcanization. The copolymers are prepared by a low temperature polymerization reaction using a diluent-refrigerant and a dissolved Friedel-Crafts type catalyst as, for example, aluminum chloride dissolved in an alkyl halide solvent. The resulting interpolymers are elastic, rubberlike substances having Staudinger molecular weights within the range between about 25,000 and about 100,000, and an iodine number within the range between about 1 up to about 50, and is reactive with sulfur particularly in the presence of a sulfurization aid.

The present invention provides a novel type of substantially insoluble interpolymer, the interpolymerization reaction being carried out between an isoolefin, a conjugated diolefin, and a relatively small amount of from a lower limit of more than 0.8% up to a maximum of about 4% of a divinyl aromatic hydrocarbon such as divinyl benzene, and preferably from 1% to 4% of divinyl benzene. The resulting interpolymers are also elastic substances having physical characteristics closely similar to but much improved over the simple copolymers of isobutylene and conjugated diolefins. The physical properties of the vulcanized products are particularly improved with regard to modulus values. The cure rate is also improved. There may also be shown a reduced cold flow in the raw gum copolymer. In addition, the copolymers of the present invention are substantially insoluble in organic solvents, such as aliphatic, aromatic, or chlorinated solvents. This insolubility property makes these novel modified polymers highly useful for certain commercial purposes in which a tough rubber is wanted, such as for mechanical goods, tire treads and curing bag stocks in which the more soluble polymers would be substantially useless. More oil plasticizers can also be employed in these modified copolymers.

These modified interpolymers can be readily combined with sulfur mono-chloride or with elemental sulfur under the influence of a sulfurization aid, such as tetramethylthiuram disulfide, in a manner similar to the vulcanization process employed for the well known interpolymers of isobutylene and the conjugated diolefins. Thus, these new copolymer compositions are readily vulcanizable by well-known commercial methods.

The process of the present invention comprises the preparation of a mixture of the preferred iso-monoolefin, isobutylene, in major proportion and a diolefin containing at least two conjugated ethylenic linkages and having from 4 to 8 carbon atoms per molecule in minor proportion, such substances including butadiene, isoprene, piperylene, and dimethyl butadiene, and adding to the mixture above 0.8%, but not more than about 4% by weight, of the isobutylene, of divinyl benzene. The resulting mixture is polymerized at a temperature below 0° C. within the range from 0° C. to —164° C. This polymerization is carried out by application to the cold olefinic mixture of a Friedel-Crafts catalyst in solution to produce the desired modified copolymer which generally will contain substantial quantities of insoluble gel. The reaction mixture containing the copolymer is dumped into water to hydrolyze and remove the residual catalyst and to drive out the dissolved and adsorbed monomers present from the original reaction mixture. The polymer can then be compounded with appropriate amounts of zinc oxide, carbon black, stearic acid, and other additives, if desired, and a curing agent or agents which may be sulfur and a sulfurization aid, or a non-sulfur curing agent such as p-quinone dioxime or dinitroso benzene, or their analogues, homologues and/or equivalents. The resulting compounded polymer can then be extruded into the desired shape, since modified copolymers containing no more than about 4% of divinyl benzene have an extrusion rate sufficiently high to make extrusion practical. It should be pointed out, however, that as the amount of divinyl benzene is increased in the copolymer the extrusion rate decreases to a marked degree. This is evidence of the increased toughness of the modified product.

In actually practicing the invention, the first raw material is the preferred iso-monoolefin, isobutylene, which is preferably of a purity of at least 96 to 99.5%. The second raw material is a multiolefin containing at least two carbon-to-carbon double linkages, the preferred substance is a conjugated diolefin such as isoprene or butadiene, but other multiolefins having from 4 to 8, inclusive, carbon atoms can be used. The isobutylene and the conjugated diolefin are mixed together in a proportion which depends somewhat upon the characteristics of the multiolefin. For instance, with butadiene, the reaction mixture which is to be polymerized may contain from 70 to 90 parts of isobutylene with from 30 to 10 parts of butadiene, with isoprene, the preferred range is from 95 to 99.5 parts of isobutylene with from 5 to 0.5 parts of isoprene. It is to be noted that most of the multiolefins do not copolymerize into the finished copolymer in the proportion in which they are present in the initial reaction mixture. For instance, in polymerizing butadiene and isobutylene together, approximately 20% of butadiene present in the mixture causes the copolymerization of only about 1% of the butadiene into the copolymer, and accordingly, there is a change in relative concentrations of butadiene and isobutylene as the batch reaction proceeds. Most of the other unsaturates show different polymerization ratios.

For the modifying material, the preferred substance is a divinyl aromatic compound such as divinyl benzene, or an analogous compound such as the alkyl-substituted divinyl benzenes. Either the para compound, the ortho compound or meta compounds can be used, or mixtures of any two or all three can be employed. Similarly, the analogous naphthyl compounds may be used, as can the divinyl toluenes and the divinyl xylenes. Similarly, diisopropenylbenzene is also useful. In using these substances, it is of primary importance to employ percentages which are within critical limits. At least more than 0.8% of modifier should be employed under conditions to give a tough insoluble copolymer and preferably above 1% of the divinyl aromatic compound is used.

The polymerization reaction may be conducted batchwise or in a continuous operation in which continuous streams of cold catalyst and cold unsaturate with a diluent are delivered to the reactor and an overflow of slurry or solution of polymer is taken out for the recovery of the polymer.

The polymerization reaction is conducted within a temperature range between 0° C. and −164° C., preferably within the range between −40° C. or −50° C. and −110° C. The reduced temperature may be obtained by the direct admixture to the reacted olefins of a refrigerant-diluent such as liquid propane, solid carbon dioxide, liquid ethane or liquid ethylene. For an internal refrigerant it is essential that the refrigerant be free from any tendency to copolymerize and free from any tendency to react with the catalyst. Alternatively, the reduced temperature may be obtained by a refrigerating jacket upon the reaction vessel. Any convenient refrigerant may be used in the reactor jacket including carbon dioxide, propane, ethane and ethylene and the like.

In carrying out the polymerization reactions employing modifying agents it is preferred to conduct the reaction in the presence of from 1 to 10 volumes of a diluent which may be a refrigerant-diluent or may be a simple diluent such as ethyl or methyl chloride, or methylene or ethylene dichloride, or chloroform, or ethylene trichloride, or a hydrocarbon such as propane, butane or the like. In any event, it is preferred to employ a reaction diluent containing more than 50% by volume of an alkyl halide having from 1 to 2 carbon atoms, the preferred diluents being methyl chloride or ethyl chloride. The principal requirements for the diluent are that it shall be liquid at the reaction temperature, that it shall be not reactive with the catalyst and that it shall be sufficiently stable under the reaction conditions to avoid the production of break-down products. Various of the chloro-fluoro hydrocarbons as well as other inert diluents which are quite soluble in the reaction mixture can be used.

The catalyst employed is a Friedel-Crafts active metal halide catalyst substance in solution in a low-freezing, non-complex-forming solvent. Aluminum chloride is usually the preferred catalytic substance with aluminum bromide and titanium tetrachloride just about as satisfactory. Boron trifluoride in solution is satisfactorily usable with some of the diolefins. For the catalyst solvent, it is only necessary that the solvent have a freezing point below 0° C., although it is usually convenient to use a catalyst solvent having a freezing point below the polymerization temperature. These requirements are met by any solvent which is low freezing; thereby having a freezing point below the freezing point of water. The preferred catalyst solvents with aluminum chloride are ethyl and methyl chloride or methylene or ethylene dichloride, or chloroform, or occasionally, propyl chloride or the like. With aluminum bromide or boron trifluoride, the same solvents are advantageously usable and, in addition, the low-freezing hydrocarbons such as liquid ethane, liquid butane, liquid heptane, liquid hexane and the like are also usable.

It should be noted that in minor amounts of up to about 0.4 to 0.8% maximum limit both dimethallyl and divinyl benzene function more or less as equivalents when used as modifiers for copolymers of isobutylene and conjugated diolefins, particularly isoprene. This is shown by the curves of the accompanying figure in which the per cent of gel, that is, the solubility of the copolymer, is plotted against the per cent modification. However, above a concentration value of 1.0% of modifier the properties of these materials differ markedly when they are employed as cross-linking agents. Divinyl benzene produces a tough insoluble type of copolymer having relatively large quantities of at least above 20%–25% of insoluble gel. However, dimethallyl when employed in concentrations greater than 1% gives modified copolymer products which are substantially soluble and contain relatively much lower amounts of gel. These differences have been shown to be particularly significant in polymerizations employing the alkyl halides as diluents and using at least one volume of diluent per volume of mixed reactants.

The production of soluble or insoluble polymers containing more or less quantities of gel by the use of modifiers such as dimethallyl, divinyl benzene is considerably influenced by certain other factors as well as the concentration of the modifier employed. The most important factor other than the amount of cross-linking agent is the average chain length of the polymer produced. This chain length can be affected by changing the ratio of diluent. For instance, if there are 10 parts of diluent per part of isobutylene reactant, the chain length will be substantially shorter than if 2 parts of diluent per part of isobutylene reactant are used. Similarly, the chain length may be shortened by use of poisons such as butene-1, propylene, etc., which do not enter substantially into the polymerization. A third method of shortening chain length is accomplished by polymerizing the olefinic mixture to high conversion. The reduction in chain length by the use of each of these methods or any combination thereof will tend to reduce the gel formation resulting from the combined effect of the chain length and the cross-linking agent. Increasing the ratio of the conjugated multiolefin to that of isobutylene will also tend to reduce gel formation as is shown in the accompanying figure. In the laboratory, particularly with batch polymerizations it is preferable to use the "poison" method of control because large quantities of diluent reduce the quantity of polymer produced per run. However, in continuous operation, molecular weight control is best obtained by the use of diluent and by control of the conversion. In either case, the method of molecular weight control is not important to the final results in determining the effect of the amount of cross-linking agent.

In measuring the cold flow properties of a plastic polymer, a portion of the raw polymer free from any compounding agents, sufficient in amount to make a cylindrical pellet ¾" in diameter and ½" in height is placed in a cylindrical mould and held for 40 minutes at a temperature of 287° F. under sufficient pressure to produce a homogeneous, well-shaped pellet. The pellet is then removed from the mould, measured for heights, and placed on a flat plate in an air oven held at 40° C. A weight of 1.8 kilograms is then placed on the pellet and allowed to remain for three minutes. At the end of the three minutes, the weight is removed and the pellet is placed in boiling water for 15 minutes to allow complete recovery of the elastic component of the deformation. The pellet is then accurately measured for its final height. The "cold flow" or "permanent deformation" is then calculated from the following equation:

$$\text{Cold flow (percent/sec.)} = \frac{\text{Original height minus final height}}{\text{Original height} \times \text{time (sec.)}} \times 100$$

It will be noted that this procedure measures the change in height due to flow at 40° C. and avoids any question of elastic deformation which may not be rapidly recovered. It is found that this measurement method is an excellent means for determining the resistance of the polymer to plastic flow and to change of shape during standing at room temperature in plant processing.

In measuring the extrusion rate, a small or laboratory type extruder consisting of a power-driven worm operating within a corrugated casing with a die at the outlet end is used, and the rate in inches per minute at which the polymer can be forced through the die without the production of irregular or erratic product is measured. The extruder usually has a steam-jacketed barrel and the extrusion may be conducted at temperatures ranging from 200° F. to 280° F., the preferred temperature being 237° F. The number of inches of tube which can be extruded in one minute is then measured and this measurement is an excellent indication of the rate at which the polymer can be extruded in plant practice.

The amount of "swell" is determined by measurement of the gram weight per inch of a tube extruded through a standard die. The standard die has an 0.4" diameter opening and an 0.3" diameter core so as to give an extruded tube of 0.4" outside diameter and an 0.3" inside diameter and a value of 1.03 grams per inch if no "swell" occurred. The weight of 1 inch of the tube extruded from this die is the "swell."

In the examples shown below, all parts and percentages are by weight unless otherwise indicated.

This application is a continuation-in-part of application Serial No. 753,040, filed June 6, 1947, and abandoned May 2, 1952.

EXAMPLE 1

A series of batch polymerizations were conducted in which the first batch contained 97 parts of isobutylene of approximately 98.5% purity with 3 parts of isoprene of approximately 96% purity. This batch was cooled by a liquid ethylene cooling jacket to approximately −103° C. (the temperature tends to range between −95° C. and −102° C.) and there was added to the mixture approximately 3 volumes of methyl chloride. When the mixture had been fully cooled to the desired temperature, it was polymerized by the addition of approximately 150 parts of an 0.2% solution of aluminum chloride in methyl chloride; this amount being sufficient to cause the polymerization of approximately 54% of the unsaturates present, as shown in the following Table I. Simultaneously, an additional batch was prepared containing 4% divinyl benzene. This was similarly polymerized as shown in Table I. After the polymerization step, the polymerized mixture was discharged into warm water to volatilize out the methyl chloride and the unpolymerized unsaturates and the polymer was then brought up to room temperature, dried, compounded and then extruded in the standard extruder to determine the permissible extrusion rate and swell. Simultaneously, measurements of cold flow were made as above outlined. At the same time other portions of the polymer were compounded according to the following recipe:

|  | Parts |
|---|---|
| Polymer | 100 |
| Zinc oxide | 5 |
| Sulfur | 2 |
| Carbon black (channel black) | 50 |
| Tuads (tetramethylthiuram disulfide) | 1 |
| Captax (2-mercaptobenzothiazole) | 0.5 |

Portions of the two batches of polymers so compounded were cured in the press for 20 and 40 minutes and determinations were then made in tensile strength, elongation at break and modulus at 300% extension, as shown in Table I:

Table I

| Run No. | Feed: 97% isobutylene, 3% isoprene | Percent Conv. | M. W. × 10⁻³ | Cold Flow, Percent/sec.[1] (1.8 Kg. @ 40° C.) | Rate, in./min. | Swell, gr./in. | Cure @ 307° F., 50 Pts. Channel Black | | | | | |
|---|---|---|---|---|---|---|---|---|---|---|---|---|
|  |  |  |  |  |  |  | Tensiles | | Elong. | | Mod. 300% | |
|  |  |  |  |  |  |  | 20' | 40' | 20' | 40' | 20' | 40' |
| 1 | Feed, Control | 54 | 50 | 0.016 | 56 | 1.65 | 2,120 | 1,900 | 830 | 680 | 320 | 500 |
| 2 | Feed +4.0 DVB | 62 | 55 | 0.000 | 28.5 | 2.14 | 1,390 | 1,730 | 530 | 520 | 690 | 910 |

[1] Pure gum.

In the above table, the divinyl benzene was added in the form of a solution containing approximately 40% of the divinyl benzene itself, the remaining 60% being mostly ethyl vinyl benzene and di-ethyl benzene. The amount of divinyl benzene shown in the table is that actually added, not the amount of the mixed solution added.

These results show the very great reduction in cold flow of the polymer which is found to be sufficient to reduce the inspection loss from bruising and similar damage in normal tube factory processing operations. The changes in the cured physical properties of the cured polymer were not very great although some sacrifice in tensile strength was indicated.

EXAMPLE 2

With concentrations of divinyl benzene as high as 4% in the feed it has been found that the extrusion rate of the polymer is reduced to an undesirably low rate. However, the very low cold flow of the polymer makes it possible to introduce up to 20% hydrocarbon oil without increasing the flow of the polymer beyond practical limits. With the oil in the compound the extrusion rate is greatly improved as shown below.

| Polymer No. | 1 | 2 | 3 |
|---|---|---|---|
| Percent Divinyl benzene | 0.2 | 4.0 | 4.0 |
| Mooney of Polymer | 54 | 54 | 54 |
| Percent Hydrocarbon Oil in Compound | 0 | 0 | 10 |
| Extrusion: |  |  |  |
| Rate, in./min | 60.1 | 34.0 | 49 |
| Swell gr./in | 2.24 | 1.98 | 1.80 |

EXAMPLE 3

The polymers shown in Table II were prepared with from 1 to 4% of the divinyl benzene in the feed. The basic feed was made up of 100 parts of isobutylene, 3 parts of isoprene and 461 parts of methyl chloride diluent. Butene-1 was used as a molecular weight modifier to permit a better comparison of the effect of the divinyl benzene on the final polymer products. All polymerizations were conducted in a 2.5 liter batch polymerization reactor with liquid ethylene external refrigeration, giving a reaction temperature of about −103° C.

Table II
EFFECT OF DIVINYL BENZENE CONCENTRATION IN BATCH POLYMERS

| Run No. | Feed | | Percent Conv. based on isobutylene | Percent Gel | Mooney Viscosity 1½'-8' | Extrusion | | | 8' Cure @ 320° F. | | |
|---|---|---|---|---|---|---|---|---|---|---|---|
|  | Parts DVB | Parts Butene-1 |  |  |  | Rate | Swell | App.[1] | Tensile | Elong. | 300% Mod. |
| 477-102-4 | 0 | 5.0 | 44 | 0 | 70-67 | 54.5 | 1.80 | S | 2,020 | 730 | 580 |
| 477-102-10 | 1 | 9.7 | 46 |  | 55-50 | 45.5 | 2.43 | I | 1,780 | 670 | 690 |
| 477-102-6 | 2 | 13.9 | 69 | 55.8 | 72-68 | 25 | 2.64 | VR | 2,050 | 570 | 890 |
| 477-102-7 | 4 | 13.9 | 62.4 | 83.7 | 56-57 | 24.5 | 2.76 | VR | 1,750 | 510 | 960 |

[1] S=smooth; I=intermediate to rough; VR=very rough.

The results show that increasing the divinyl benzene concentration from 1 to 4% caused a marked reduction in extrusion properties. Tensile properties were only moderately affected but a marked improvement in cure rate and modulus values was obtained. These polymers in the compounded form were extremely nervy and had no noticeable cold flow even after standing for six weeks.

EXAMPLE 4

The 1% divinyl benzene modified polymer of Example 3 and the control were compounded in the following formulation:

| | Parts |
|---|---|
| Polymer | 100 |
| Zinc oxide | 25 |
| Philblack A (SRF) | 60 |
| Sulfur | 2 |
| Mercaptobenzothiazyl disulfide | 2 |
| p-Quinone dioxime | 4 |

The respective polymers were cured in 1" x 1" x 2" blocks at 320° F. for 120 minutes. After aging in steam and air, it was found that the divinyl benzene modified polymer lost only 20% in shore hardness while the control stock made with no divinyl benzene in the feed lost 60%. These results show that the modified polymer is very useful in curing bag stocks where retention of surface hardness is an important property.

EXAMPLE 5

This example shows, in Table III, the data used to plot the curves of the accompanying figure. The modified polymers were prepared in a 6" baffleless batch reactor using external ethylene refrigeration. The feed mixture was diluted 2 to 1 by volume with methyl chloride. The polymerizations were carried out by adding a catalyst mixture of about 0.2 g. aluminum chloride per 100 cc. of methyl chloride.

The invention is intended to include both the new polymerization process or method of making the modified copolymers, and also the modified isoolefin-conjugated diolefin copolymer compositions themselves.

Table III

MODIFIED RAW POLYMER PROPERTIES
DIVINYL BENZENE

| Run No. | Feed Designation [1] | Modification, Percent | Percent Conv. | Percent Gel Hot Milled Polymer |
|---|---|---|---|---|
| 793-113-1 | B-1.5 | 0 | 66.1 | 0.6 |
| 793-113-2 | B-1.5 | 0.25 | 67.6 | 0.95 |
| 793-113-3A | B-1.5 | 0.50 | 51.5 | 3.44 |
| 793-113-4A | B-1.5 | 0.75 | 66.1 | 9.75 |
| 793-113-5 | B-1.5 | 1.00 | 81.5 | 22.0 |
| 793-114-1 | B-3 | 0 | 71.0 | 0 |
| 793-114-2 | B-3 | 0.25 | 58.8 | 0 |
| 793-114-3 | B-3 | 0.50 | 77.8 | 0.25 |
| 793-114-4 | B-3 | 0.75 | 69.2 | 2.44 |
| 793-114-5 | B-3 | 1.00 | 75.5 | 9.48 |
| 477-102-6 | B-3 | 2.00 | 69 | 55.8 |

DIMETHALLYL

| Run No. | Feed Designation [1] | Modification, Percent | Percent Conv. | Percent Gel Hot Milled Polymer |
|---|---|---|---|---|
| 793-98-1 | B-1.5 | 0 | 55.5 | 0.8 |
| 793-98-2 | B-1.5 | 0.5 | 79 | 11.3 |
| 793-98-3A | B-1.5 | 1.0 | 72 | 16.8 |
| 793-98-4 | B-1.5 | 2.0 | 91.5 | 28.1 |
| 793-99-1 | B-3 | 0 | 72 | 0.3 |
| 793-99-2 | B-3 | 0.5 | 86 | 0.65 |
| 793-99-3 | B-3 | 1.0 | 61 | 9.8 |
| 793-99-4 | B-3 | 2.0 | 83.5 | 16.9 |

[1] B-1.5=1.5% isoprene in feed; B-3=3.0% isoprene in feed.

What is claimed is:

1. In the process of making vulcanizable rubbery polymers of increased toughness and improved physical properties, composed of a major proportion of an isoolefin having from 4 to 5 carbon atoms, a minor proportion of a conjugated aliphatic diolefin of 4 to 8 carbon atoms, using proportions to make a copolymer having an iodine number of about 1 to 50 and a minor proportion of a divinyl aromatic compound, by polymerization at a temperature below −40° C. with a Friedel-Crafts catalyst dissolved in a non-complex-forming solvent which is liquid at the polymerization temperature, the steps in combination which comprise using an amount of said divinyl aromatic compound of about 1% up to a maximum of about 4% by weight based on isobutylene, while also using a reaction diluent containing more than 50% by volume of an alkyl halide of 1 to 2 carbon atoms, and using in excess of one volume of said reaction diluent per volume of mixed olefin reactants, whereby an insoluble polymer is obtained.

2. A vulcanizable, substantially insoluble rubbery polymer prepared by the process of claim 1.

3. In the process of making vulcanizable rubber polymers of increased toughness and improved physical properties, composed of a major proportion of isobutylene, a minor proportion of a conjugated aliphatic diolefin of 4 to 8 carbon atoms, using proportions to make a copolymer having an iodine number of about 1 to 50 and a minor proportion of divinyl benzene, by polymerization at a temperature below −40° C. with a Friedel-Crafts catalyst dissolved in a non-complex-forming solvent which is liquid at the polymerization temperature, the steps in combination which comprise using an amount of divinyl benzene of about 1% up to a maximum of about 4% by weight based on isobutylene, while also using a reaction diluent containing more than 50% by volume of an alkyl halide of 1 to 2 carbon atoms, and using in excess of one volume of said reaction diluent per volume of mixed olefin reactants, whereby an insoluble polymer is obtained.

4. A vulcanizable, substantially insoluble rubbery polymer prepared by the process of claim 3.

5. The process comprising copolymerizing 70 to 99.5% by weight of isobutylene together with 0.5 to 30% by weight of a conjugated aliphatic diolefin of 4 to 8 carbon atoms, using proportions to make a copolymer having an iodine number of about 1 to 50 and about 1% up to a maximum of about 4% by weight of a divinyl aromatic compound based on the isobutylene, at a temperature between 0° C. and −164° C., by the addition of a dissolved Friedel-Crafts catalyst, and in the presence of at least 1 volume of inert diluent per volume of mixed olefin reactants, said diluent containing at least 50% by volume of an alkyl halide of 1 to 2 carbon atoms.

6. A vulcanizable rubbery polymer prepared by the process of claim 5.

7. The process of claim 5 in which the conjugated diolefin is butadiene.

8. The process of claim 5 in which the conjugated diolefin is isoprene.

9. The process comprising copolymerizing 95 to 99.5% by weight of isobutylene together with 5 to 0.5% of isoprene, and about 4% by weight of divinyl benzene based on the isobutylene, at a temperature between −40° C. and −164° C., in the presence of a dissolved aluminum chloride catalyst and in the presence of at least one volume per volume of mixed olefin reactants of a diluent consisting of a haloalkane having from 1 to 2 carbon atoms.

10. The process comprising copolymerizing about 97% by weight of isobutylene together with about 3% by weight of isoprene, and about 4% by weight of divinyl benzene based on the isobutylene at a temperature of approximately −103° C. with a catalyst solution comprising aluminum chloride dissolved in methyl chloride in the presence of about 3 volumes of methyl chloride.

11. A rubbery product consisting essentially of a polymer prepared by copolymerizing a mixture of unsaturates containing 70 to 99.5% by weight of isobutylene together with 0.5 to 30% by weight of a conjugated aliphatic diolefin of 4 to 8 carbon atoms, and about 1% up to a maximum of about 4% by weight of a divinyl aromatic compound, based on the amount of isobutylene used, said copolymer having a Staudinger molecular weight of 25,000 to 100,000, an iodine number of 1 to 50, and reactivity with sulfur to yield an elastic product.

12. A rubbery product according to claim 11 in which the copolymer comprises 2.5 to 3.0% of isoprene as the conjugated aliphatic diolefin, and about 4% by weight of divinyl benzene, based on the amount of isobutylene used.

13. A rubbery product consisting essentially of a copolymer of about 95 to 99.5% by weight of isobutylene, about 5 to 0.5% of isoprene, and about 1 to 4% of divinyl benzene, based on the amount of isobutylene, said copolymer having a Staudinger molecular weight of about 25,000 to 100,000, an iodine number of 1 to 50, and reactivity with sulfur to yield an elastic product.

References Cited in the file of this patent

UNITED STATES PATENTS

| | | |
|---|---|---|
| 2,322,073 | Thomas et al. | June 15, 1943 |
| 2,356,128 | Thomas et al. | Aug. 22, 1944 |
| 2,474,807 | Schoene | July 5, 1949 |
| 2,626,940 | Sparks et al. | Jan. 27, 1953 |

OTHER REFERENCES

Baron: "Modern Plastics," pages 78, 80, 90 and 91 (1945), John Wiley and Sons, N. Y.